United States Patent
Omoto (10) Patent No.: US 12,436,143 B2
(45) Date of Patent: Oct. 7, 2025

(54) COOLANT STATE ESTIMATION SYSTEM, COOLANT STATE ESTIMATION METHOD, STORAGE MEDIUM, LEARNED MODEL, AND MACHINE LEARNING DEVICE

(71) Applicant: TOYOTA JIDOSHA KABUSHIKI KAISHA, Toyota (JP)

(72) Inventor: Suguru Omoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 649 days.

(21) Appl. No.: 17/888,634

(22) Filed: Aug. 16, 2022

(65) Prior Publication Data

US 2023/0077748 A1    Mar. 16, 2023

(30) Foreign Application Priority Data

Sep. 16, 2021   (JP) .................................. 2021-151042

(51) Int. Cl.
   *G01N 33/28* (2006.01)
   *G06N 5/022* (2023.01)

(52) U.S. Cl.
   CPC ......... *G01N 33/2894* (2013.01); *G06N 5/022* (2013.01)

(58) Field of Classification Search
   CPC .... G01N 33/2894; G06N 5/022; G06N 3/084; G06N 3/044; G06N 3/09
   See application file for complete search history.

(56) References Cited

U.S. PATENT DOCUMENTS

| | | | | |
|---|---|---|---|---|
| 2010/0058848 | A1* | 3/2010 | Hamama | F01P 11/16 73/114.68 |
| 2017/0139432 | A1 | 5/2017 | Endou | |
| 2017/0357243 | A1 | 12/2017 | Takayama et al. | |
| 2020/0338677 | A1* | 10/2020 | Ozeki | G05B 23/024 |

FOREIGN PATENT DOCUMENTS

| | | |
|---|---|---|
| JP | 2009-101449 A | 5/2009 |
| JP | 2010-188480 A | 9/2010 |
| JP | 2017-87403 A | 5/2017 |
| JP | 2017-220111 A | 12/2017 |
| JP | 2019-141958 A | 8/2019 |
| JP | 2020-179433 A | 11/2020 |

* cited by examiner

*Primary Examiner* — Tarun Sinha
(74) *Attorney, Agent, or Firm* — Oliff PLC (57) ABSTRACT

A coolant state estimation system that estimates a temporal change of a state of a coolant used in a processing machine includes a coolant state acquisition unit that acquires a measurement value regarding the state of the coolant as measurement information in which the measurement value is associated with measurement time of the measurement value, a processing information acquisition unit that acquires processing information on a processing condition of the processing machine, and an estimation unit that estimates a temporal change of the measurement value after the measurement time of the measurement information using a learned model based on the measurement information and the processing information. The learned model is a model that has learned the temporal change of the measurement value using teacher data created from the measurement information and the processing information.

10 Claims, 8 Drawing Sheets

| No. | $x_1$ | $x_2$ | | | | | | | | | | | | | | $x_{n-1}$ | $x_n$ | $y_{t0}$ |
|---|---|---|---|---|---|---|---|---|---|---|---|---|---|---|---|---|---|---|
| 1 | $x_{11}$ | $x_{21}$ | · | · | · | · | · | · | · | · | · | · | · | · | · | $x_{n-11}$ | $x_{n1}$ | $y_{t01}$ |
| 2 | $x_{12}$ | $x_{22}$ | · | · | · | · | · | · | · | · | · | · | · | · | · | $x_{n-12}$ | $x_{n2}$ | $y_{t02}$ |
| · | · | · | | | | | · | | | | | | | | | · | · | · |
| · | · | · | | | | | · | | | | | | | | | · | · | · |
| m-1 | $x_{1m-1}$ | $x_{2m-1}$ | · | · | · | · | · | · | · | · | · | · | · | · | · | $x_{n-1m-1}$ | $x_{nm-1}$ | $y_{t0m-1}$ |
| m | $x_{1m}$ | $x_{2m}$ | · | · | · | · | · | · | · | · | · | · | · | · | · | $x_{n-1m}$ | $x_{nm}$ | $y_{t0m}$ |

COOLANT STATE ESTIMATION SYSTEM, COOLANT STATE ESTIMATION METHOD, STORAGE MEDIUM, LEARNED MODEL, AND MACHINE LEARNING DEVICE

CROSS-REFERENCE TO RELATED APPLICATION

This application claims priority to Japanese Patent Application No. 2021-151042 filed on Sep. 16, 2021, incorporated herein by reference in its entirety.

BACKGROUND

1. Technical Field

The present disclosure relates to a coolant state estimation system, a coolant state estimation method, a storage medium, a learned model, and a machine learning device.

2. Description of Related Art

In a processing machine such as a machine tool, coolant (cutting fluid) is supplied during processing and tool replacement. Since the coolant plays an important role in the processing machine, such as improving the processing accuracy and suppressing the wear of the tool, it is necessary to properly manage the state of the coolant.

Therefore, for example, Japanese Unexamined Patent Application Publication No. 2010-188480 (JP 2010-188480 A) discloses a technique in which various sensors are provided in a coolant tank for storing the coolant supplied to the processing machine, and the state of the coolant (concentration, hardness, etc.) is continuously measured to monitor the state of the coolant.

SUMMARY

Here, the inventor has found the following problems with respect to the technique for continuously measuring the state of the coolant.

In order to measure the state of the coolant accurately, it is necessary to agitate the coolant to make the state of the coolant in the coolant tank uniform at the time of measurement. Therefore, there is a problem in which even when the state of the coolant is continuously measured as in the related art, the state of the coolant cannot be accurately measured in a time zone when the coolant is not sufficiently agitated, for example, when the processing machine is stopped, so that the state of the coolant cannot be properly managed.

The present disclosure has been made in view of such circumstances, and an object of the present disclosure is to provide a coolant state estimation system, a coolant state estimation method, a storage medium, and a learned model that can estimate the state of the coolant, and a machine learning device that can learn the temporal change of the state of the coolant, even in the time zone when the coolant is not sufficiently agitated.

A coolant state estimation system according to one aspect of the present disclosure is a coolant state estimation system that estimates a temporal change of a state of a coolant used in a processing machine. The coolant state estimation system includes a coolant state acquisition unit that acquires a measurement value regarding the state of the coolant as measurement information in which the measurement value is associated with measurement time at which the measurement value is measured, a processing information acquisition unit that acquires processing information on a processing condition of the processing machine, and an estimation unit that estimates a temporal change of the measurement value after the measurement time of the measurement information using a learned model based on the measurement information and the processing information. The learned model is a model that has learned the temporal change of the measurement value using teacher data created from the measurement information and the processing information.

With such a configuration, it is possible to estimate the temporal change of the measurement value regarding the state of the coolant, so that even when the measurement value regarding the state of the coolant cannot be continuously and accurately measured, the state of the coolant can be properly managed based on the estimated temporal change the measurement value.

In the coolant state estimation system according to the above aspect, the processing information may be information including processing plan information on a processing plan of the processing machine.

With such a configuration, it is possible to include the processing plan that can influence the temporal change of the measurement value regarding the state of the coolant and estimate the temporal change of the measurement value regarding the state of the coolant.

In the coolant state estimation system according to the above aspect, the processing information may be information including environmental information on an environment in which the processing machine is used.

With such a configuration, it is possible to include the environmental information that can influence the temporal change of the measurement value regarding the state of the coolant and estimate the temporal change of the measurement value regarding the state of the coolant.

The coolant state estimation system according to the above aspect may further include a work plan determination unit that determines a work plan for improving the state of the coolant based on the temporal change of the measurement value estimated by the estimation unit.

With such a configuration, it is possible to determine the appropriate work plan for improving the state of the coolant from the temporal change of the measurement value regarding the state of the coolant.

In the coolant state estimation system according to the above aspect, the work plan determination unit may determine work time and a work content.

With such a configuration, it is possible to determine the appropriate work plan for improving the state of the coolant in more detail from the temporal change of the measurement value regarding the state of the coolant.

In the coolant state estimation system according to the above aspect, the work plan determination unit may determine the work time within a period during which processing by the processing machine is stopped, based on a processing plan of the processing machine.

With such a configuration, the work is performed within the period during which the processing by the processing machine is stopped, so that the work can be performed without stopping the processing even when the coolant is replaced. In addition, it is possible to secure the time to make the state of the coolant uniform after the work is completed and before the processing machine is operated.

In the coolant state estimation system according to the above aspect, the measurement value may include at least one of a liquid amount of the coolant, a concentration of the coolant, a temperature of the coolant, pH of the coolant, and hardness of the coolant.

With such a configuration, it is possible to estimate the temporal change of the measurement value regarding the various states of the coolant, and to suppress adverse effects caused by these.

A coolant state estimation method according to one aspect of the present disclosure is a coolant state estimation method that causes a computer to estimate a temporal change of a state of a coolant used in a processing machine, and includes a coolant state acquisition step of acquiring a measurement value regarding the state of the coolant as measurement information in which the measurement value is associated with measurement time at which the measurement value is measured, a processing information acquisition step of acquiring processing information on a processing condition of the processing machine, and an estimation step of estimating a temporal change of the measurement value after the measurement time of the measurement information using a learned model based on the measurement information and the processing information. The learned model is a model that has learned the temporal change of the measurement value using teacher data created from the measurement information and the processing information.

Further, a storage medium storing a program according to one aspect of the present disclosure is a storage medium storing a program for executing a coolant state estimation method that estimates a temporal change of a state of a coolant used in a processing machine, the program causing a computer to execute a coolant state acquisition step of acquiring a measurement value regarding the state of the coolant as measurement information in which the measurement value is associated with measurement time at which the measurement value is measured, a processing information acquisition step of acquiring processing information on a processing condition of the processing machine, and an estimation step of estimating a temporal change of the measurement value after the measurement time of the measurement information using a learned model based on the measurement information and the processing information.

The learned model is a model that has learned the temporal change of the measurement value using teacher data created from the measurement information and the processing information.

Further, a learned model according to one aspect of the present disclosure is
a learned model that has learned a temporal change of a measurement value regarding a state of a coolant used in a processing machine using teacher data created from measurement information in which the measurement value is associated with measurement time at which the measurement value is measured and processing information on a processing condition of the processing machine, the learned model causing a computer to perform a function of outputting the temporal change of the measurement value after the measurement time of the measurement information with respect to inputs of the measurement information and the processing information.

With such a configuration, it is possible to estimate the temporal change of the measurement value regarding the state of the coolant, so that even when the measurement value regarding the state of the coolant cannot be continuously and accurately measured, the state of the coolant can be properly managed based on the estimated temporal change the measurement value.

Further, a machine learning device according to one aspect of the present disclosure is a machine learning device that learns a temporal change of a state of a coolant used in a processing machine, and includes a coolant state acquisition unit that acquires a measurement value regarding the state of the coolant as measurement information in which the measurement value is associated with measurement time at which the measurement value is measured, a processing information acquisition unit that acquires processing information on a processing condition of the processing machine, and a learning unit that learns a temporal change of the measurement value based on teacher data created from the measurement information and the processing information.

With such a configuration, it is possible to generate the learned model that can learn the temporal change of the measurement value regarding the state of the coolant and estimate the temporal change of the measurement value.

The present disclosure can provide the coolant state estimation system, the coolant state estimation method, the storage medium, and the learned model that can estimate the state of the coolant, and the machine learning device that can learn the temporal change of the state of the coolant, even in the time zone when the coolant is not sufficiently agitated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a specific embodiment to which the disclosure is applied will be described in detail with reference to the drawings. However, the disclosure is not limited to the following embodiment. The following description and drawings are simplified as appropriate for the sake of clarity.

First Embodiment

Figure 1:
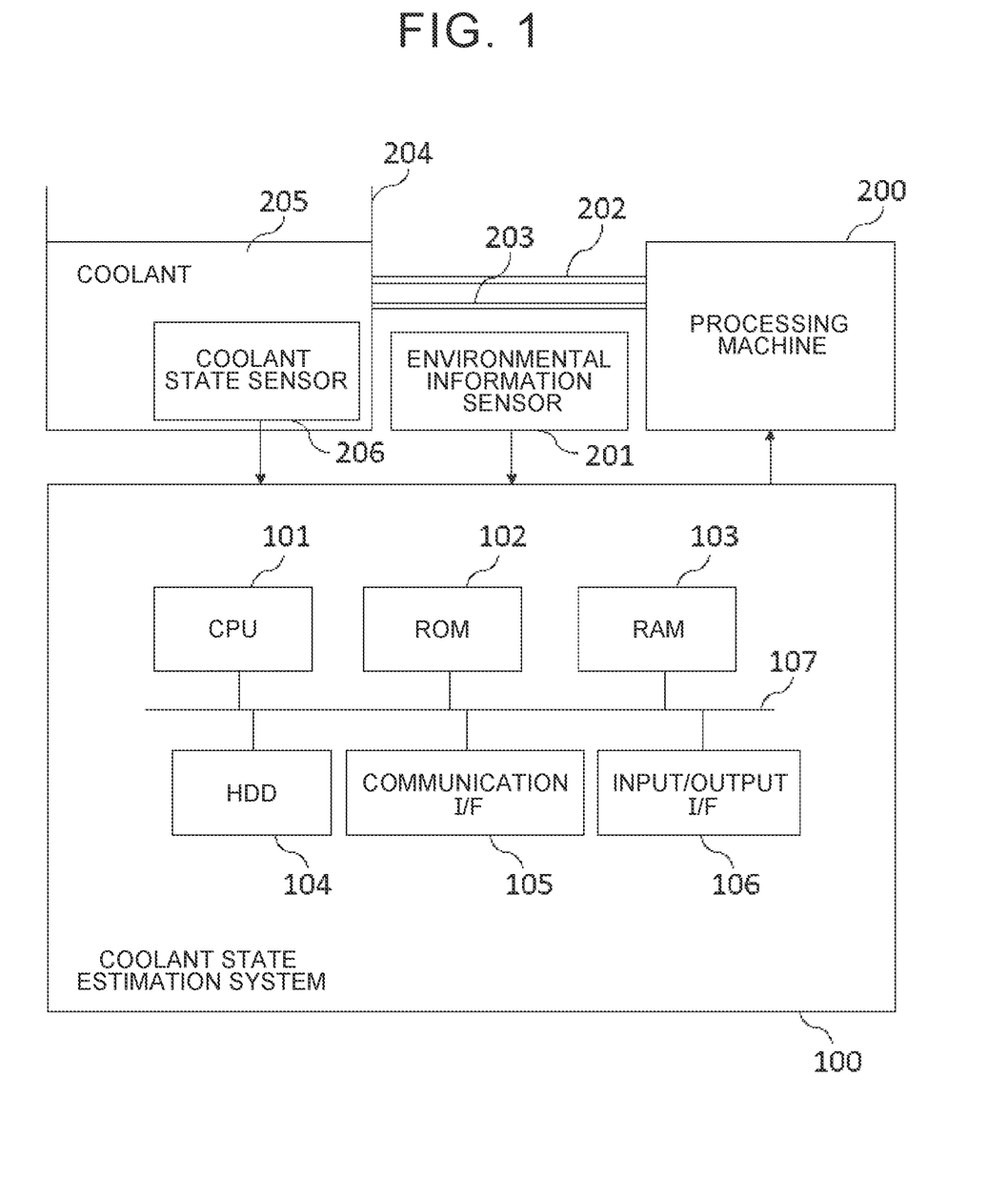
FIG. 1 is a diagram showing an outline of a hardware configuration of a coolant state estimation system according to a first embodiment.

First, a coolant state estimation system according to a first embodiment will be described. FIG. 1 is a block diagram showing an outline of a hardware configuration of a coolant state estimation system 100 according to the first embodiment.

As shown in FIG. 1, the coolant state estimation system 100 has a computer resource possessed by a general information processing device such as a personal computer. Specifically, the coolant state estimation system 100 includes a central processing unit (CPU) 101, a read-only memory (ROM) 102, a random access memory (RAM) 103, a hard disk drive (HDD) 104, a communication interface (I/F) 105, and an input/output interface (I/F) 106. Further, each of these parts is connected to each other so as to be able to communicate with each other via a data bus 107. Here, an example in which each part of the coolant state estimation system 100 is realized by an information processing device in which control functions of a processing machine 200 is incorporated will be described, but each part thereof may be realized by an information processing device that is provided independently from a control device having the control functions of the processing machine 200, or a part or all of these functions may be realized by an external device such as an edge or a cloud.

The CPU 101 is a microprocessor that collectively controls the coolant state estimation system 100. Specifically, the CPU 101 reads various control programs stored in the ROM 102 and the HDD 104 and executed in the present embodiment, and executes these programs loaded on the RAM 103. Here, as a storage device, a solid state drive (SSD) may be provided in place of or in addition to the HDD 104.

The communication interface 105 communicates between the coolant state estimation system 100 and the external device. Here, communication is realized by various communication technologies regardless of whether it is wireless communication or wired communication.

In the present embodiment, for example, environmental information is received from an environmental information sensor 201 that is provided around the processing machine 200 and that measures the environmental information on an environment in which the processing machine 200 is used. Further, a measurement value regarding the state of a coolant 205 is received from a coolant state sensor 206 that is provided in a coolant tank 204 connected to the processing machine 200 via a coolant supply path 202 and a coolant recovery path 203 and that measures the measurement value regarding the state of the coolant 205.

The input/output interface 106 performs input/output between the coolant state estimation system 100 and the outside. For example, an output device such as a display that displays information on the estimated state of the coolant 205, and an input device to be used by an operator are provided.

Figure 2:
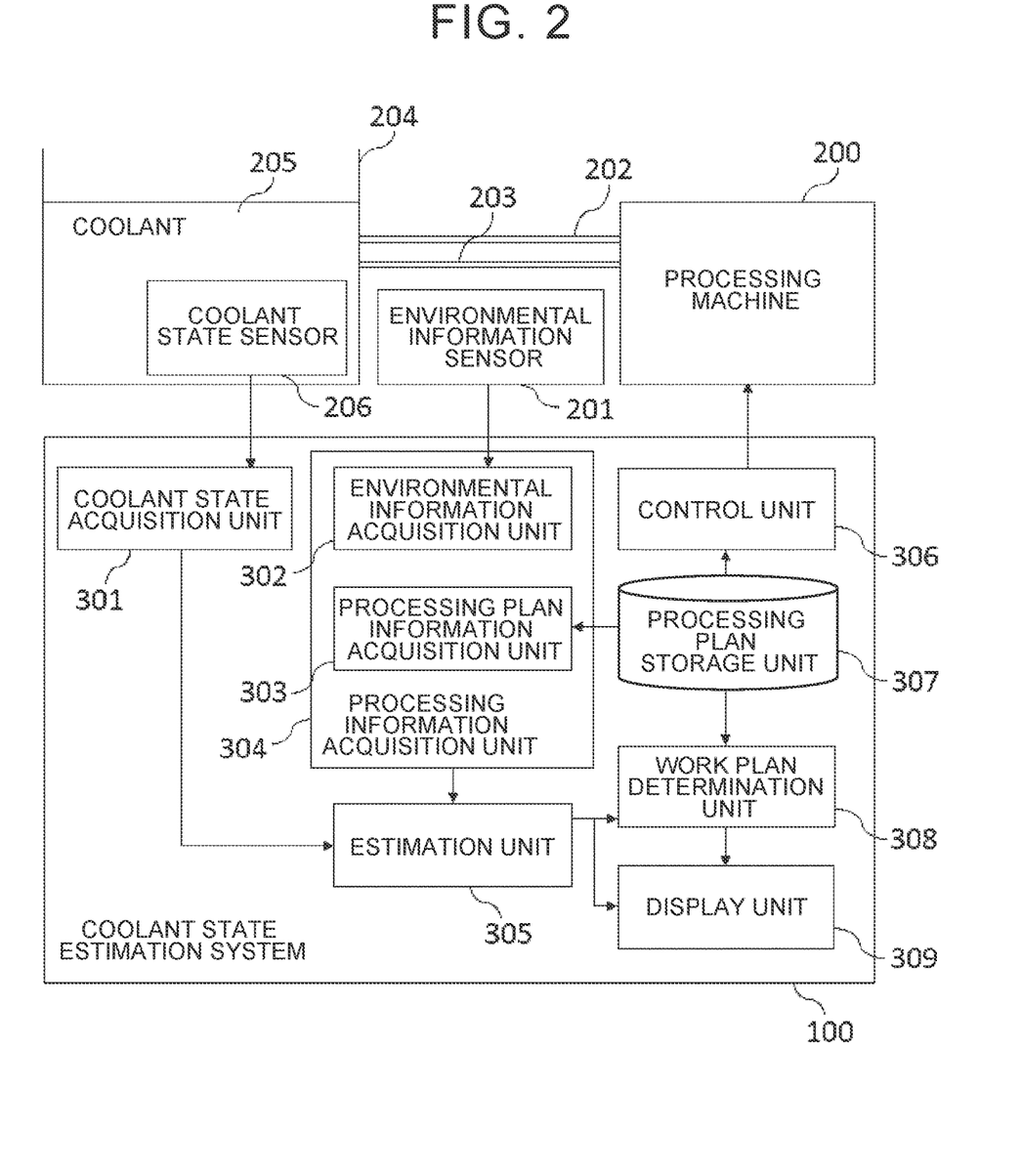
FIG. 2 is a diagram showing a functional configuration of the coolant state estimation system according to the first embodiment.

Next, a functional configuration of the coolant state estimation system 100 according to the present embodiment will be described. FIG. 2 is a block diagram showing the functional configuration of the coolant state estimation system 100 according to the present embodiment.

As shown in FIG. 2, the coolant state estimation system 100 includes, as the functional configuration, a coolant state acquisition unit 301, a processing information acquisition unit 304 including an environmental information acquisition unit 302 and a processing plan information acquisition unit 303, an estimation unit 305, a control unit 306, a processing plan storage unit 307, a work plan determination unit 308, and a display unit 309. These units function by the CPU 101 executing various control programs stored in the ROM 102 or the like. Further, a part or all of the functions of the coolant state estimation system 100 may be realized by a hardware circuit.

The coolant state acquisition unit 301 acquires the measurement value regarding the state of the coolant 205 as measurement information in which the measurement value is associated with measurement time at which the measurement value is measured. Specifically, from the coolant state sensor 206 that measures the liquid amount, the concentration, the temperature, the pH, the hardness, etc. of the coolant 205, the measurement value as a measurement result is acquired as the measurement information in which the measurement value is associated with the measurement time at which the measurement value is measured. Here, only the measurement value may be acquired from the coolant state sensor 206, and in the coolant state acquisition unit 301, the measurement value may be associated with the measurement time, and the measurement value associated with the measurement time may be acquired as the measurement information.

Further, the measurement information may be acquired from the coolant state sensor 206 provided in the coolant tank 204, but may be acquired when the operator measures the state of the coolant by using various sensors independent of the coolant tank 204 and inputting the state of the coolant to the coolant state estimation system 100. That is, in the present disclosure, since it is not always necessary to continuously measure the state of the coolant, the coolant state sensor 206 provided in the coolant tank 204 may not be provided. With such a configuration, one sensor can be shared by a plurality of the coolant tanks 204, so that the cost can be reduced.

The processing information acquisition unit 304 acquires processing information a processing condition of the processing machine 200. Specifically, the processing information acquisition unit 304 includes an environmental information acquisition unit 302 and a processing plan information acquisition unit 303.

The environmental information acquisition unit 302 acquires environmental information on an environment in which the processing machine 200 is used. Specifically, the environmental information is acquired from the environmental information sensor 201 that is provided around the processing machine 200 and that measures the temperature, the humidity, etc. of the environment in which the processing machine 200 is used. Here, the environmental information may be acquired from the environmental information sensor 201, but may also be acquired using weather information, weather forecast information, or the like provided from the outside.

The processing plan information acquisition unit 303 acquires processing plan information on a processing plan of the processing machine 200. Specifically, from the processing plan of the processing machine 200 stored in the processing plan storage unit 307, information on the number of processed parts processed by the processing machine 200, the operation rate indicating the ratio of the time during which the processing machine 200 is operating, a cycle time indicating the time required for the processing machine 200 to process one part, and the like is acquired. Here, an example in which the coolant state estimation system 100 includes the processing plan storage unit 307 has been described, but the processing plan information may be acquired from the processing plan of the processing machine 200 stored in the external device such as the edge or the cloud.

Further, in the present disclosure, the processing information acquired by the processing information acquisition unit 304 is not limited to the above environmental information and processing plan information, and includes a wide range of processing information on the processing condition such as information on a main spindle rotation speed, a cutting speed, and a tool of the processing machine 200.

Based on the measurement information acquired by the coolant state acquisition unit 301 and the processing information acquired by the processing information acquisition unit 304, the estimation unit 305 measures the temporal change of the measurement value after the measurement time of the measurement information by using a learned model. Specifically, the measurement values of the liquid amount, the concentration, the temperature, the pH, the hardness, etc. after a lapse of a predetermined time from the measurement time of the measurement information are estimated. In the present disclosure, the temporal change of the measurement value may include both the continuous time-series data of the measurement value after the measurement time and the measurement value at one time point after the lapse of the predetermined time from the measurement time, and the estimation unit 305 may be configured to estimate only the measurement value at one time point after the lapse of the predetermined time from the measurement time. Here, the above learned model is a model that has learned in advance the temporal change of the measurement value using teacher data created from the measurement information and the processing information in the coolant state estimation system 100 or the external device, and that is stored in the estimation unit 305, but a specific learning method will be described below in detail.

The control unit 306 controls the processing operation by the processing machine 200. For example, based on the processing plan stored in the processing plan storage unit 307, the drive of a servomotor or the like provided in the processing machine 200 is numerically controlled to control the processing operation.

The work plan determination unit 308 determines the work plan for improving the state of the coolant 205 based on the temporal change of the measurement value regarding the state of the coolant 205 estimated by the estimation unit 305. Specifically, the necessity of replenishment/replacement of the coolant is determined from the temporal change of the measurement value regarding the estimated state of the coolant 205, and the work content and work time necessary for improving the state of the coolant 205 are determined. For example, the normal range and the like of the measurement value regarding the state of the coolant 205 is stored in the memory in advance, and when the estimated measurement value after the lapse of the predetermined time deviates from the normal range, the timing before the lapse of the predetermined time is determined as the work time.

Further, regarding the work content, when the measurement value falls within the normal range by replenishment of the coolant 205, the replenishment amount and the concentration of the coolant to be replenished to keep the measurement value within the normal range are calculated using the estimated measurement value, and the replenishment amount and the concentration of the coolant to be replenished are determined as the work content. On the other hand, when the measurement value cannot be kept within the normal range by the replenishment of the coolant 205, the replacement of the coolant 205 is determined as the work content. In addition, an example can be considered in which the work content required to improve the state of the coolant 205 is associated with the temporal change of the measurement value regarding the state of the coolant 205, and is stored in the memory in advance by a table or the like, and the work content is determined based on the estimated temporal change of the measurement value. In this case, an experiment is conducted in advance, or an interview is conducted with a highly skilled operator, so that it is possible to determine the work content necessary for improving the state of the coolant 205.

As described above, the work plan determination unit 308 determines the work content and the work time, but may be configured to determine only one of these. That is, the operator may determine the work time in advance and input the work time to the work plan determination unit 308, whereby the work plan determination unit 308 may determine the work content to be executed at the work time, or the work plan determination unit 308 may determine only the work time when the work is required, notify the operator of the work time, so that the operator may determine the work content.

Here, the work plan determination unit 308 can also determine the work time by further using the processing plan of the processing machine 200 stored in the processing plan storage unit 307. Specifically, when the estimated measurement value after the lapse of the predetermined time deviates from the normal range, the work time is determined before the lapse of the predetermined time and within the period during which the processing by the processing machine 200 is stopped.

Here, when the coolant 205 is replaced as the work content, it is necessary to stop the processing by the processing machine 200 while the coolant 205 is being replaced, and even when the coolant 205 is replenished, a certain period of time is required until the replenished coolant 205 is mixed with the remaining coolant 205. Therefore, as the work time, a period during which the processing by the processing machine 200 is stopped may be preferable, and the work plan determination unit 308 can determine the work time within the period during which the processing by the processing machine 200 is stopped. The period during which the processing is stopped is not limited to the period during which the power supply of the processing machine 200 is stopped, but includes the period during which the processing is temporarily stopped in order to adjust the processing condition, etc. of the processing machine 200.

The display unit 309 displays the temporal change of the measurement value regarding the state of the coolant 205 estimated by the estimation unit 305 and the work plan (work content and work time) necessary for improving the state of the coolant 205 determined by the work plan determination unit 308. The information displayed on the display unit 309 can be notified to the operator, and for example, when the temporal change of the measurement value regarding the state of the coolant 205 is notified, the operator can determine the necessary work time and work content, and perform the work. Further, although the example in which the coolant state estimation system 100 includes the display unit 309 as the information processing device has been described here, the display unit 309 may be provided on a tablet terminal or the like owned by the operator.

Further, in the present embodiment, although the configuration has been described in which the temporal change of the measurement value regarding the state of the coolant 205 estimated by the estimation unit 305 and the work plan (work content and work time) necessary for improving the state of the coolant 205 determined by the work plan determination unit 308 are notified to the operator to instruct the operator to perform the predetermined work, a coolant supply unit (not shown) for automatically supplying the coolant 205 to the coolant tank 204 may be further provided to automatically perform the work determined by the work plan determination unit 308 through the control of the coolant supply unit.

Next, a machine learning device 400 according to the present embodiment will be described. Although detailed description of the hardware configuration of the machine learning device 400 is omitted here, the machine learning device 400 has the computer resource possessed by the general information processing device as in the coolant state estimation system 100. Further, here, although an example in which each part of the machine learning device 400 is realized by the information processing device independent of the coolant state estimation system 100 will be described, the machine learning device 400 may be realized as a configuration incorporated inside the coolant state estimation system 100.

Here, in a factory where a large number of processing machines are located, for example, each processing machine and each coolant state estimation system 100 located in each cell in the factory are connected to a fog server via a network, and the fog server provided for each cell is connected to a cloud server via the network. In such a configuration, the machine learning device 400 may be provided on the fog server or the cloud server. When the machine learning device 400 is provided on the server as described above, it is possible to collect the information from the coolant tanks 204 and the like via the network, and learn the temporal change of the measurement value regarding the state of the coolant.

Figure 3:
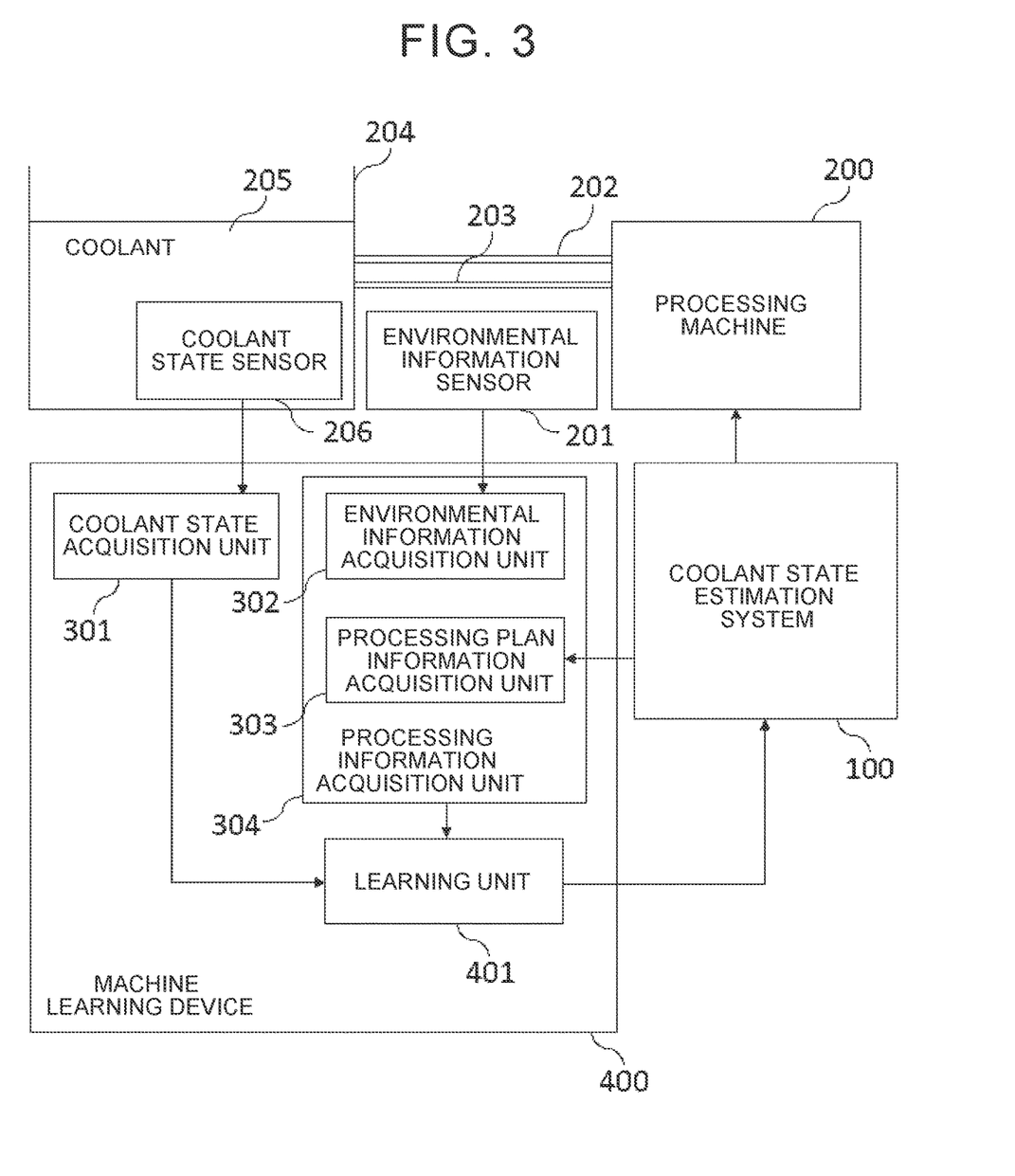
FIG. 3 is a diagram showing a functional configuration of a machine learning device according to the first embodiment.

Next, the functional configuration of the machine learning device 400 according to the present embodiment will be described. FIG. 3 is a block diagram showing the functional configuration of the machine learning device 400 according to the present embodiment.

The machine learning device 400 includes the coolant state acquisition unit 301, the processing information acquisition unit 304 including the environmental information acquisition unit 302 and the processing plan information acquisition unit 303, and a learning unit 401. As described above, the coolant state acquisition unit 301, the environmental information acquisition unit 302, and the processing plan information acquisition unit 303 acquire the measurement information on the state of the coolant 205, the environmental information on the environment in which the processing machine 200 is used, and the processing plan information in the processing machine 200, respectively Here, various factors that can influence the temporal change of the state of the coolant 205 will be described. The coolant supplied from the coolant tank 204 to the processing machine 200 via the coolant supply path 202 is used in the processing machine 200, returned to the coolant tank 204 via the coolant recovery path 203, and reused. At that time, part of the coolant 205 used in the processing machine 200 adheres to the work processed by the processing machine 200 and is taken out of the processing machine 200. Further, the components of the work and impurities adhering to the work are dissolved in the coolant 205 and collected in the coolant tank 204. Therefore, the processing plan information such as the number of processed parts processed by the processing machine 200 and the operation rate of the processing machine 200 can influence the temporal change of the state of the coolant 205.

Further, the coolant 205 partially volatilizes in the above cycle, but since the coolant 205 is used in a state where the undiluted solution thereof and water are mixed, the state of the coolant 205 (ratio between the undiluted solution and the water) changes by volatility because of the difference in volatility between the undiluted solution and the water. Here, the amounts of volatilization of the undiluted solution and the water are influenced by the temperature and humidity around the processing machine 200. Therefore, the environmental information on the environment in which the processing machine is used can influence the temporal change of the state of the coolant 205.

Therefore, in the present embodiment, the learning unit 401 creates and stores the teacher data from the measurement information in which the measurement value regarding the state of the coolant 205 is associated with the measurement time of the measurement value, which has been acquired by the coolant state acquisition unit 301, and the processing information on the processing condition of the processing machine 200, which has been acquired by the processing information acquisition unit 304, and based on the teacher data, the learning unit 401 learns the temporal change of the measurement value regarding the state of the coolant, that is, performs supervised learning. The supervised learning is to learn the teacher data, that is, a learning data set of a certain input and a result of the input, and generate a learned model in which the result is presumed or estimated from the input, and in the present disclosure, various methods used in the supervised learning can be used.

Here, taking a neural network as an example, a learning phase in which the machine learning device 400 learns the temporal change of the measurement value regarding the state of the coolant, and an operation phase in which the coolant state estimation system 100 estimates the temporal change of the measurement value regarding the state of the coolant by using the learned model that has learned the temporal change of the measurement value regarding the state of the coolant will be described. First, in the learning phase, the learning data set is created.

Figure 4:
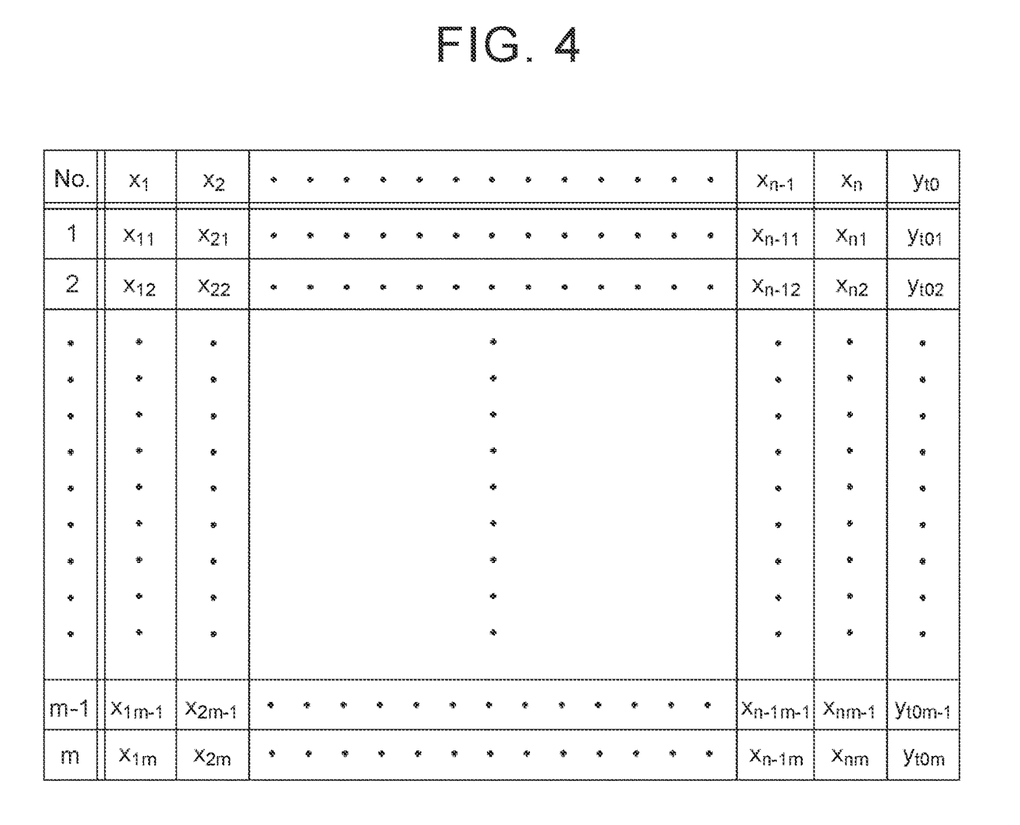
FIG. 4 is a diagram showing a learning data set used for machine learning according to the first embodiment.

FIG. 4 shows an example of the learning data set used in main learning. For example, as input values, in $x_{11}$, a measured value regarding the state of the coolant at time t=0, and in $x_{21}, x_{31}, \ldots x_{n-11}$, and $x_{n1}$, processing information regarding the processing condition of the processing machine from the time t=0 to time t=$t_0$, are acquired by the coolant state acquisition unit 301 and the processing information acquisition unit 304, respectively. As an output value, in $y_{t01}$, a measurement value (actual measurement value) regarding the state of the coolant at the time t=$t_0$ is acquired by the coolant state acquisition unit 301, and the learning data set of No. 1 is created and stored. When m pieces of data representing the relationship between these input values $x_1, x_2, \ldots x_{n-1}$, and $x_n$ and the output value $y_{t0}$ are prepared, the learning data set shown in FIG. 4 is created.

Figure 5:
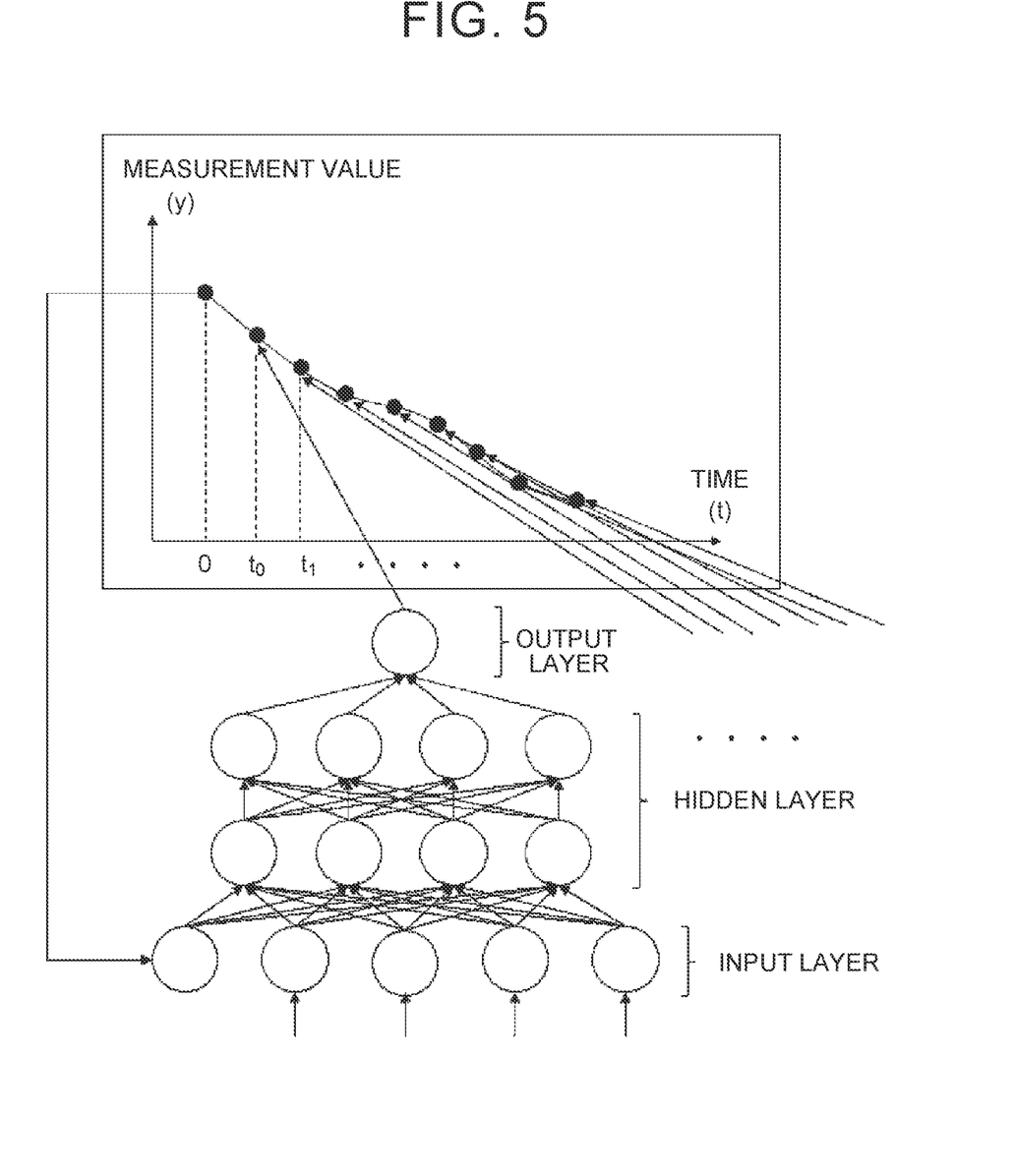
FIG. 5 is a diagram showing a neural network used for the machine learning according to the first embodiment.

Next, the neural network used for learning will be described with reference to FIG. 5. FIG. 5 shows a "multi-input and one-output" hierarchical neural network. Here, for the sake of simplicity, the hidden layer is described as two layers, but in reality, it goes without saying that the hidden layer is further multi-layered, and the number of nodes in the input layer and the hidden layer can also be changed as appropriate according the learning data set.

The input values of $x_1, x_2, \ldots x_{n-1}$, and $x_n$ are input to each node in the input layer of such a neural network using the above learning data set, so that the measurement value regarding the state of the coolant 205 at the time t=$t_0$ is output as an estimated value from the output layer. Then, learning is performed such that the estimated value matches the actual measurement value $y_{t0}$ regarding the state of the coolant 205 at the time t=$t_0$ prepared as the learning data set. Specifically, using the backpropagation or the like, learning is performed until the error between these values converges to the predetermined set error or less, and a weight and bias of the neural network (hereinafter collectively referred to as a weight) are learned. As described above, the neural network (the learned model) that outputs the temporal change of the measurement value after the measurement time of the measurement information with respect to the inputs of the measurement information regarding the state of the coolant 205 and the processing information regarding the processing condition of the processing machine 200 is generated.

The neural network of which the weight has been learned as described above is output to the estimation unit 305 of the coolant state estimation system 100, and the operation phase is executed. In the operation phase, as shown in FIG. 5, the input values of $x_1, x_2, \ldots x_{n-1}$, and $x_n$ acquired by the coolant state acquisition unit 301 and the processing information acquisition unit 304 are input to the input layer of the neural network of which the weight has been learned, the measurement value regarding the state of the coolant at the time $t=t_0$ is output from the output layer, and the measurement value regarding the state of the coolant at the time $t=t_0$ can be estimated.

Further, by the same method, each neural network that outputs the measurement value regarding the state of the coolant 205 at time $t=t_1, t_2, \ldots$ or $t_x$ is generated, so that in the operation phase, it is possible to estimate the continuous time-series data of the measurement values as shown in FIG. 5. Here, the example in which as the input value, only the measurement value at the time $t=0$ is given as the measurement value regarding the state of the coolant 205 has been described, but the measurement value regarding the state of the coolant can be acquired as the continuous time-series data, and can be given to the input layer. When the environmental information is used as the input value, only the environmental information (temperature, humidity, etc.) at or near the time $t=0$ acquired from the environmental information sensor may be given, and the forecast value from the time $t=0$ to time $t=t_n$ can be acquired as the time-series data from the weather forecast information, and can be given to the input layer.

Figure 6:
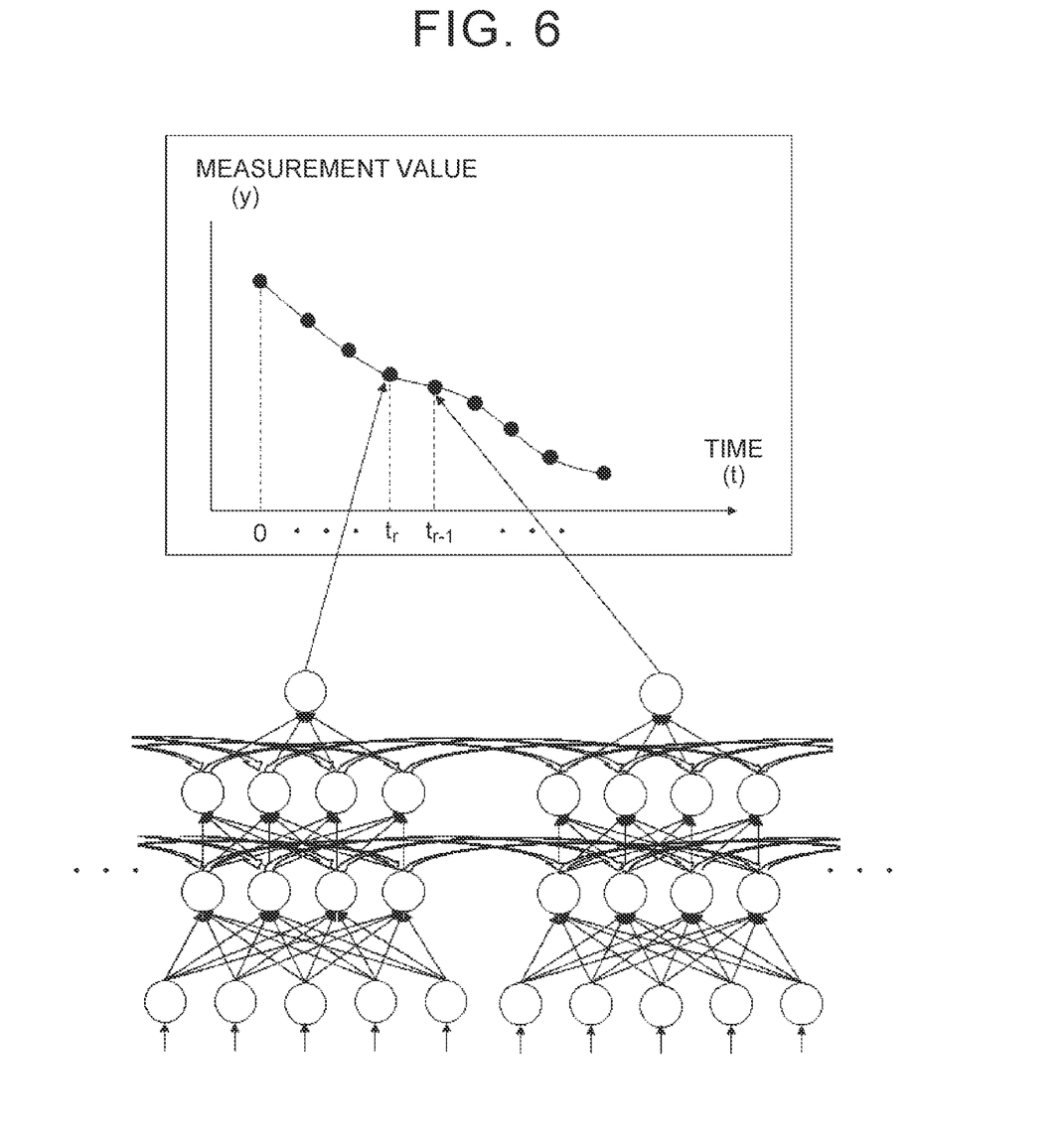
FIG. 6 is a diagram showing a recurrent neural network used for the machine learning according to the first embodiment.

Here, as described above, when the estimation unit 305 estimates the continuous time-series data of the measurement values, a recurrent neural network (RNN) can be used instead of the simple neural network shown in FIG. 5. Specifically, as shown in FIG. 6, the output of each node in the hidden layer of the neural network that outputs the measurement value at the time $t=t_n$ is used not only to the input of the next layer of the neural network, but also to the input of the neural network that outputs the measurement value at time $t=t_{n-1}$. With such a structure, in the neural network that outputs the measurement value at the time $t=t_{n+1}$, the measurement value at the time $t=t_{n+1}$ is output in consideration of the information at the time $t=t_n$ and earlier, so that the temporal change of the measurement value can be estimated with higher accuracy when the continuous time-series data of the measurement values is estimated.

Figure 7:
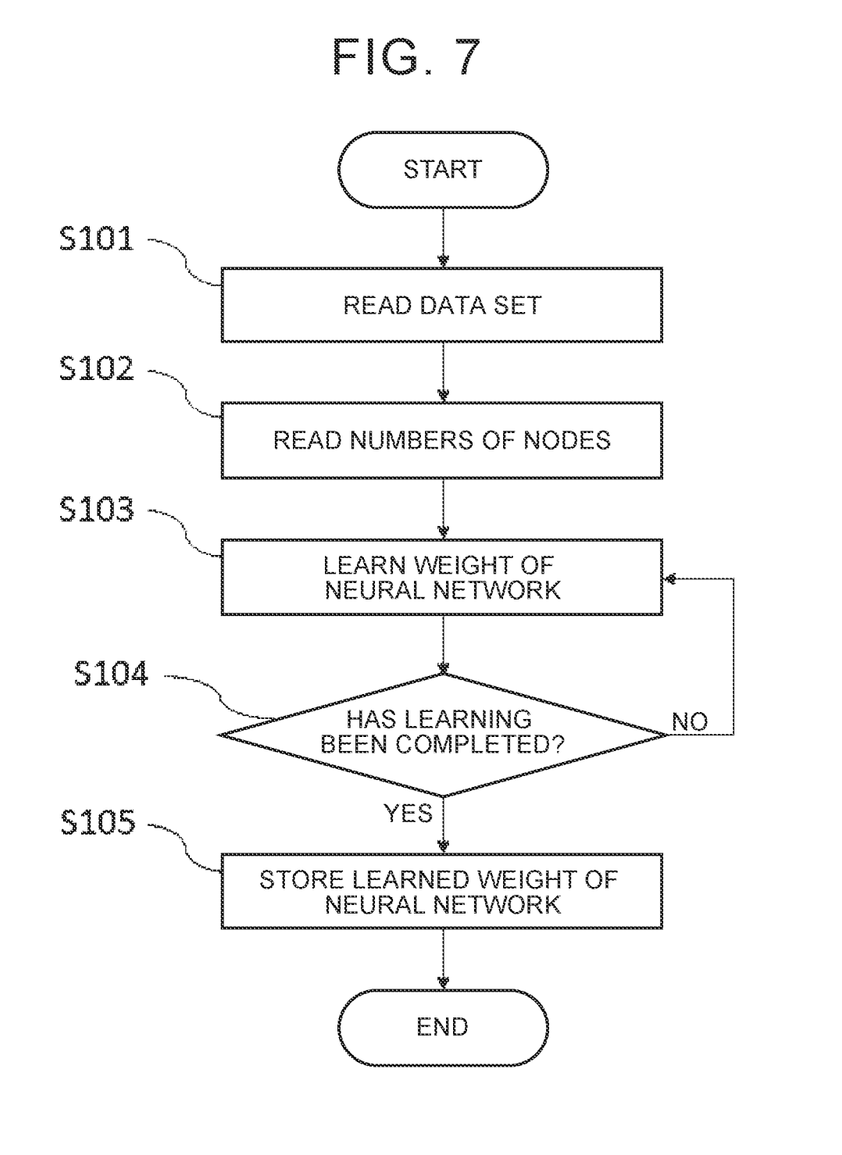
FIG. 7 is a flowchart showing a flow of a learning process according to the first embodiment.

Next, the flow of the learning phase in the machine learning device 400 according to the present embodiment, that is, the learning method will be described. FIG. 7 is a flowchart of a learning process according to the present embodiment. This flow starts, for example, in a state where a predetermined amount or more of the learning data set is accumulated in the machine learning device 400. Further, when a predetermined amount or more of the learning data set is newly accumulated from the previous learning, a main learning process may be executed, and re-learning may be performed.

First, in step 101, each data of the learning data set stored in the machine learning device 400 is read.

Next, in step 102, the numbers of nodes in the input layer, the hidden layer, and the output layer of the neural network are read, and the neural network is created.

In step 103, the weight of the neural network is learned using the read learning data set. Specifically, the input values of the learning data set No. 1 in FIG. 4 are input to the input layer, and the weight of the neural network is learned using backpropagation such that the error between the output value of the neural network to be output and the output value of the learning data set No. 1 is small. Sequentially, when learning is performed for all the data up to the mth data, the process proceeds to step 104.

In step 104, it is determined whether the error between the output value in the neural network and the output value of the learning data set has converged to the set error or less. When it is determined that the error has converged to the set error or less, the process proceeds to step 105, and the learned weight of the neural network is stored in step 105. On the other hand, when it is determined that the error has not converged to the set error or less, the weight is learned again in step 103, and learning is continued until the error between the output value in the neural network and the output value of the learning data set converges to the set error or less.

Figure 8:
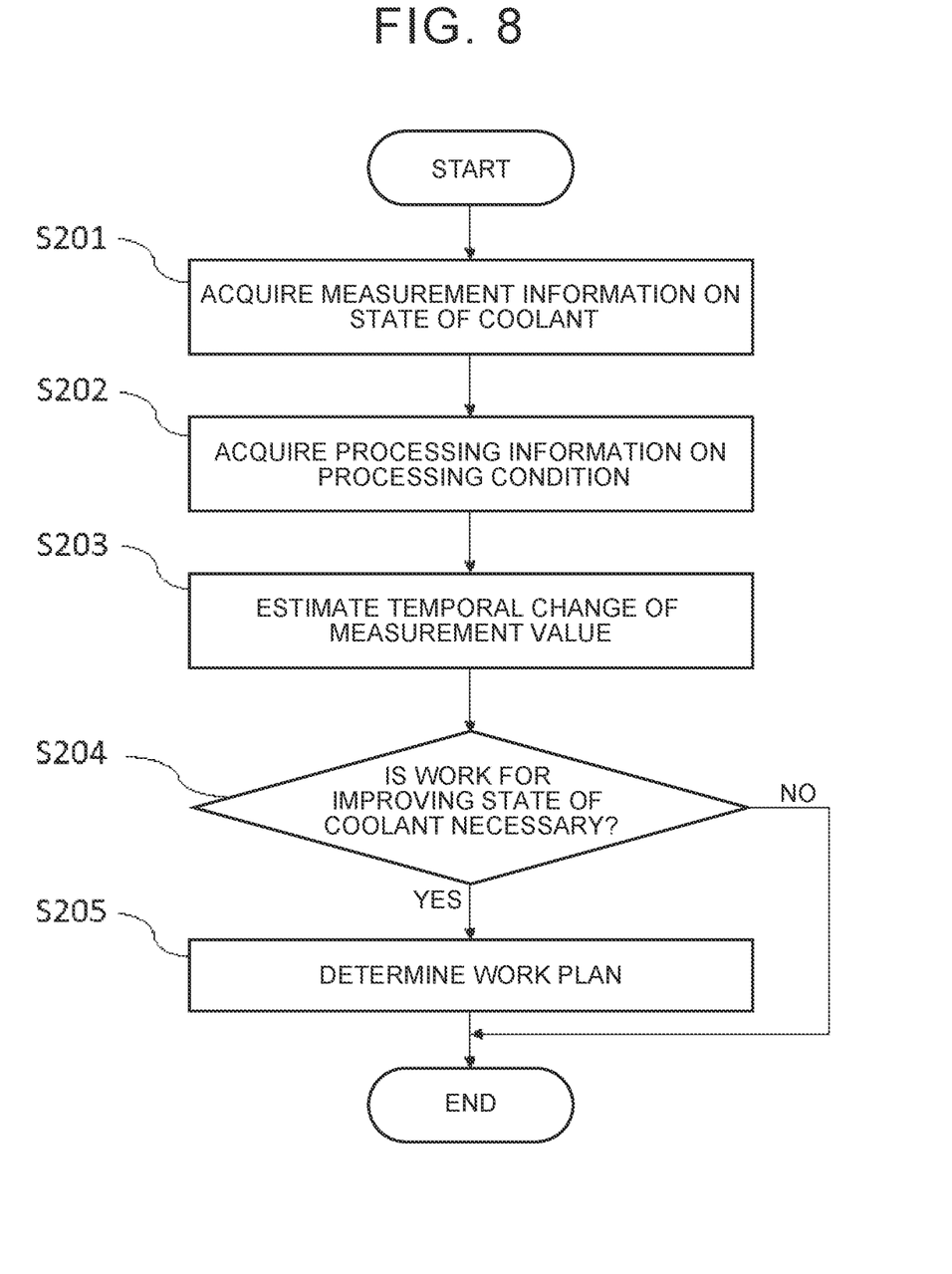
FIG. 8 is a flowchart of a coolant state estimation process according to the first embodiment.

Next, the flow of the operation phase in the coolant state estimation system 100 according to the present embodiment, that is, a coolant state estimation method will be described. FIG. 8 is a flowchart of a coolant state estimation process according to the present embodiment. This flow starts in a state where the above learning process is completed and the learned model is stored in the estimation unit 305. For example, this flow starts at the timing when a predetermined time has elapsed from the previous estimation and the timing when the measurement value regarding the state of the coolant 205 is input to the coolant state estimation system 100.

First, in step 201, the coolant state acquisition unit 301 acquires the measurement value regarding the state of the coolant 205 as the measurement information in which the measurement value is associated with the measurement time at which the measured value is measured.

Next, in step 202, the processing information acquisition unit 304 acquires the processing information on the processing condition of the processing machine 200. For example, the environmental information acquisition unit 302 acquires the environmental information on the environment in which the processing machine 200 is used, and the processing plan information acquisition unit 303 acquires the processing plan information in the processing machine 200. Here, the order of steps 201 and 202 may be changed as appropriate.

Next, in step 203, the estimation unit 305 estimates the temporal change of the measurement value after the measurement time of the measurement information using the learned model in which the above learning process has been completed based on the measurement information acquired by the coolant state acquisition unit 301 and the processing information acquired by the processing information acquisition unit 304.

Subsequently, in step 204, the work plan determination unit 308 determines whether the work for improving the state of the coolant 205 is necessary based on the temporal change of the measurement value regarding the state of the coolant 205 estimated in step 203. For example, the normal range of the measurement value regarding the state of the coolant 205 is stored in the memory in advance, and when the measurement value deviates from the normal range within the estimated time range, it is determined that the work for improving the state of the coolant 205 is necessary, and the process proceeds to step 205. On the other hand, when it is determined that the work for improving the state of the coolant 205 is unnecessary, this flow ends.

Next, in step 205, the work plan determination unit 308 determines the work plan for improving the state of the coolant 205 based on the temporal change of the measurement value regarding the state of the coolant 205. Specifically, the work content and work time are determined, and this flow ends. Although omitted in this flow, a step of outputting information on the temporal change of the measurement value regarding the state of the coolant 205 and information on the work for improving the state of the coolant 205 to the display unit 309 may be added, and when the configuration in which the coolant 205 is automatically supplied is provided, a step pf controlling the coolant supply unit and automatically supplying the coolant 205 based on the work plan may be added.

OTHER EMBODIMENTS

In the first embodiment, the case where the coolant state estimation system 100 and the machine learning device 400 are provided for each coolant tank 204 has been described as an example, but these may be shared among the coolant tanks 204, and may estimate and learn the temporal change of the state of the coolant 205 of the coolant tanks 204. Further, in the first embodiment, the configuration in which the state of the coolant tank 204 provided in each processing machine 200 is estimated has been described, but it is also possible to estimate and learn the temporal change of the state of the coolant 205 stored in a server tank (not shown) that supplies the coolant 205 to the coolant tanks 204.

Further, in the present disclosure, the processing machine may be any machine that can perform desired machining on the work and uses the coolant, and includes various types of machines such as lathes, drilling machines, milling machines, electric discharge machines, laser machines, and machining centers.

It should be noted that the present disclosure is not limited to the above embodiment, and can be appropriately modified without departing from the spirit thereof, so that the present disclosure can be implemented in various forms.

What is claimed is:

1. A coolant state estimation system that estimates a temporal change of a state of a coolant used in a processing machine, the coolant state estimation system comprising:
   a coolant state acquisition unit that acquires a measurement value regarding the state of the coolant as measurement information in which the measurement value is associated with measurement time at which the measurement value is measured;
   a processing information acquisition unit that acquires processing information on a processing condition of the processing machine; and
   an estimation unit that estimate a temporal change of the measurement value after the measurement time of the measurement information using a learned model based on the measurement information and the processing information, wherein the learned model is a model that has learned the temporal change of the measurement value using teacher data created from the measurement information and the processing information.

2. The coolant state estimation system according to claim 1, wherein the processing information is information including processing plan information on a processing plan of the processing machine.

3. The coolant state estimation system according to claim 1, wherein the processing information is information including environmental information on an environment in which the processing machine is used.

4. The coolant state estimation system according to claim 1, further comprising a work plan determination unit that determines a work plan for improving the state of the coolant based on the temporal change of the measurement value estimated by the estimation unit.

5. The coolant state estimation system according to claim 4, wherein the work plan determination unit determines a work content and work time.

6. The coolant state estimation system according to claim 4, wherein the work plan determination unit determines the work time within a period during which processing by the processing machine is stopped, based on a processing plan of the processing machine.

7. The coolant state estimation system according to claim 1, wherein the measurement value includes at least one of a liquid amount of the coolant, a concentration of the coolant, a temperature of the coolant, pH of the coolant, and hardness of the coolant.

8. The coolant state estimation system according to claim 1, wherein the temporal change of the measurement value includes both a continuous time-series data of the measurement value after the measurement time and a measurement value at a time point after a lapse of a predetermined time from the measurement time.

9. A coolant state estimation method that causes a computer to estimate a temporal change of a state of a coolant used in a processing machine, the coolant state estimation method comprising:
   a coolant state acquisition step of acquiring a measurement value regarding the state of the coolant as measurement information in which the measurement value is associated with measurement time at which the measurement value is measured;
   a processing information acquisition step of acquiring processing information on a processing condition of the processing machine; and
   an estimation step of estimating a temporal change of the measurement value after the measurement time of the measurement information using a learned model based on the measurement information and the processing information, wherein the learned model is a model that has learned the temporal change of the measurement value using teacher data created from the measurement information and the processing information.

10. A non-transitory storage medium storing a program for executing a coolant state estimation method that estimates a temporal change of a state of a coolant used in a processing machine, the program causing a computer to execute:
   a coolant state acquisition step of acquiring a measurement value regarding the state of the coolant as measurement information in which the measurement value is associated with measurement time at which the measurement value is measured;
   a processing information acquisition step of acquiring processing information on a processing condition of the processing machine; and
   an estimation step of estimating a temporal change of the measurement value after the measurement time of the measurement information using a learned model based on the measurement information and the processing information, wherein the learned model is a model that has learned the temporal change of the measurement value using teacher data created from the measurement information and the processing information.

\* \* \* \* \*